(12) United States Patent
Totsuka et al.

(10) Patent No.: US 9,787,932 B2
(45) Date of Patent: Oct. 10, 2017

(54) SOLID-STATE IMAGING DEVICE WITH CORRECTION OF A LOWER COUNT VALUE OR UPPER COUNT VALUE

(71) Applicant: CANON KABUSHIKI KAISHA, Tokyo (JP)

(72) Inventors: Hirofumi Totsuka, Fujisawa (JP); Daisuke Yoshida, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/257,549

(22) Filed: Sep. 6, 2016

(65) Prior Publication Data

US 2017/0118427 A1 Apr. 27, 2017

(30) Foreign Application Priority Data

Oct. 22, 2015 (JP) ................................. 2015-207971

(51) Int. Cl.
*H04N 5/376* (2011.01)
*H04N 5/378* (2011.01)

(52) U.S. Cl.
CPC ........... *H04N 5/378* (2013.01); *H04N 5/3765* (2013.01)

(58) Field of Classification Search
CPC .............................. H04N 5/378; H04N 5/3765
See application file for complete search history.

(56) References Cited

U.S. PATENT DOCUMENTS

| | | |
|---|---|---|
| 7,633,540 B2 | 12/2009 | Totsuka |
| 7,990,440 B2 | 8/2011 | Kobayashi |
| 8,084,729 B2 | 12/2011 | Kato |
| 8,154,639 B2 | 4/2012 | Kato |
| 8,189,081 B2 | 5/2012 | Totsuka |
| 8,309,898 B2 | 11/2012 | Kato |
| 8,400,546 B2 | 3/2013 | Itano |
| 8,411,185 B2 | 4/2013 | Totsuka |

(Continued)

FOREIGN PATENT DOCUMENTS

| | | |
|---|---|---|
| JP | 2006-128752 | 5/2006 |
| JP | 2013-85103 | 5/2013 |
| JP | 2014-120987 | 6/2014 |

OTHER PUBLICATIONS

U.S. Appl. No. 15/277,168, filed Sep. 27, 2016.
U.S. Appl. No. 15/235,679, filed Aug. 12, 2016.

*Primary Examiner* — Nicholas Giles

(74) *Attorney, Agent, or Firm* — Fitzpatrick, Cella, Harper & Scinto

(57) ABSTRACT

A solid-state imaging device includes a pixel, a comparator outputting control signal when magnitude relationship between pixel signal and reference signal is inverted, a counter circuit unit outputting N-bit count signal, a memory unit holding each bit of the count signal, wherein the count value is corrected according to the relationship between lower count value represented by lower count signal group including LSB to M-th bit of the count signal, and the upper count value represented by upper count signal group including (M+1)-th to N-th bits of the count signal. The lower count signal group comprises M-bit Gray code count signal of LSB to M-th bit of the count signal and a binary code count signal of (M+1)-th bit of the count signal, and the upper count signal group comprises (N-M) bit Gray code signal whose LSB is (M+1)-th bit of the count signal.

15 Claims, 10 Drawing Sheets

(56) References Cited

U.S. PATENT DOCUMENTS

| | | |
|---|---|---|
| 8,553,118 B2 | 10/2013 | Saito |
| 8,593,327 B2 * | 11/2013 | Hagihara ............... H04N 5/378 250/208.1 |
| 8,605,182 B2 | 12/2013 | Totsuka |
| 8,698,062 B2 | 4/2014 | Yoshida |
| 8,937,672 B2 | 1/2015 | Totsuka |
| 9,001,241 B2 * | 4/2015 | Hagihara ............... H04N 5/378 348/294 |
| 9,013,765 B2 | 4/2015 | Totsuka |
| 9,077,918 B2 | 7/2015 | Hiyama |
| 9,159,750 B2 | 10/2015 | Ikeda |
| 9,282,263 B2 | 3/2016 | Totsuka |
| 9,332,202 B2 | 5/2016 | Totsuka |
| 9,337,222 B2 | 5/2016 | Saito |
| 9,350,958 B2 | 5/2016 | Totsuka |
| 9,407,839 B2 | 8/2016 | Yoshida |
| 2012/0229666 A1 * | 9/2012 | Hagihara ............... H04N 5/378 348/222.1 |
| 2013/0063295 A1 * | 3/2013 | Hagihara ............... H04N 5/378 341/169 |
| 2015/0264283 A1 | 9/2015 | Kobayashi |
| 2015/0281614 A1 | 10/2015 | Yoshida |
| 2015/0281616 A1 | 10/2015 | Muto |
| 2015/0319380 A1 | 11/2015 | Yoshida |
| 2015/0365616 A1 | 12/2015 | Yoshida |
| 2016/0301886 A1 | 10/2016 | Muto |

* cited by examiner

NORMAL

ABNORMAL
(UPPER COUNT:
DELAYING)

ABNORMAL
(UPPER COUNT:
ADVANCING)

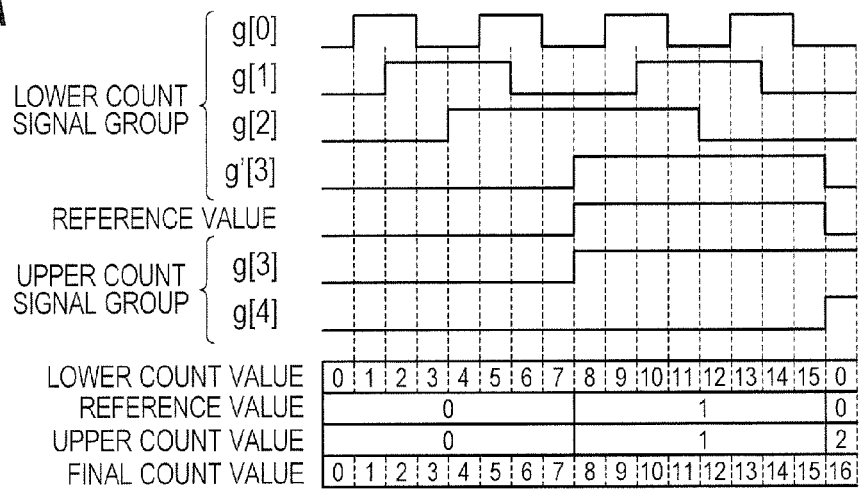
FIG. 7A NORMAL
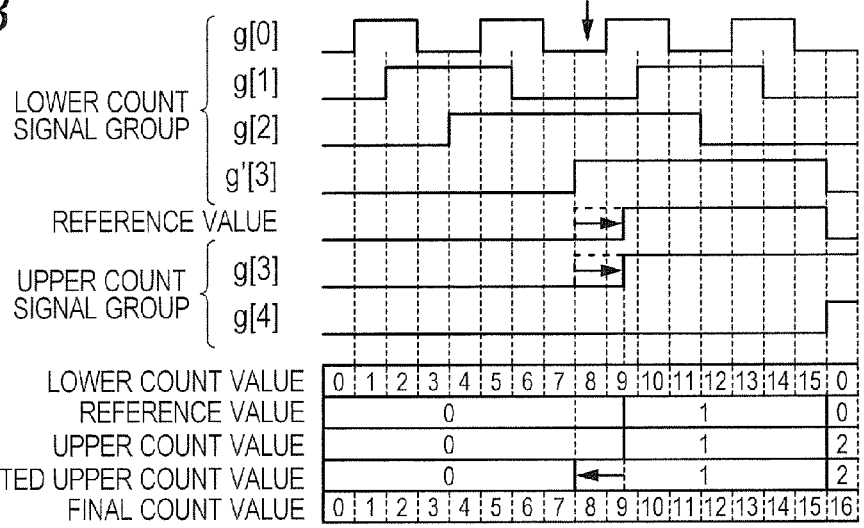
FIG. 7B ABNORMAL (UPPER COUNT: DELAYING)
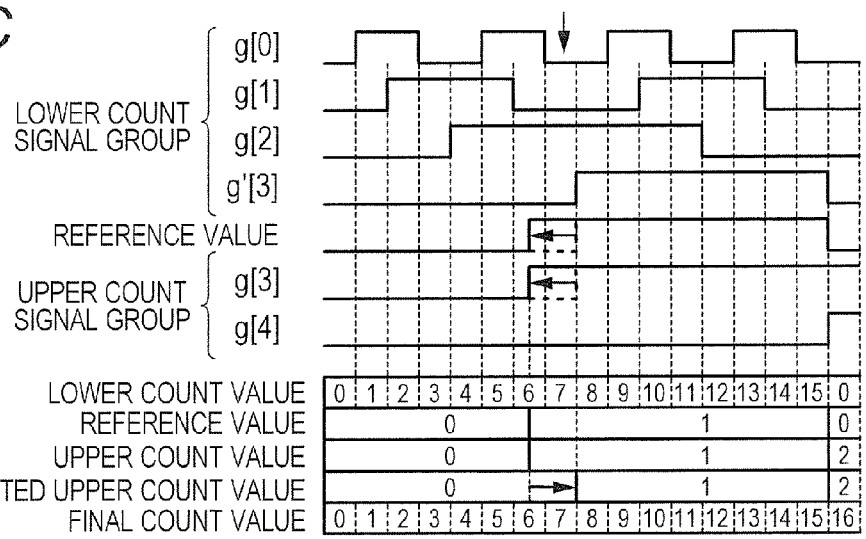
FIG. 7C ABNORMAL (UPPER COUNT: ADVANCING)

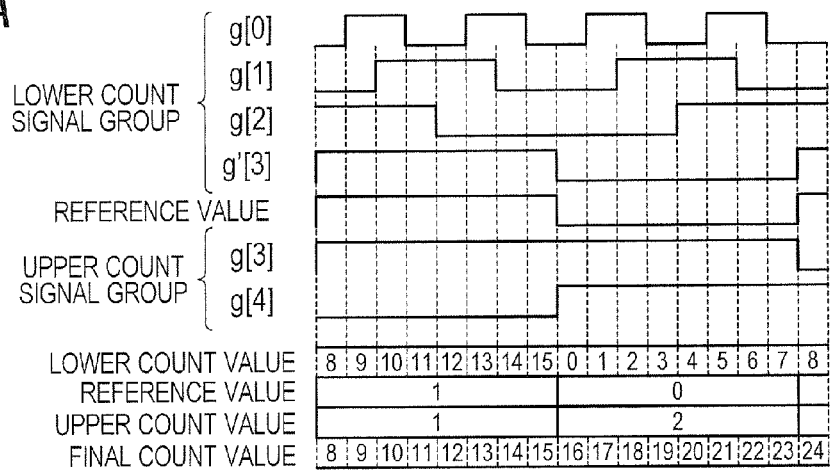
FIG. 8A NORMAL
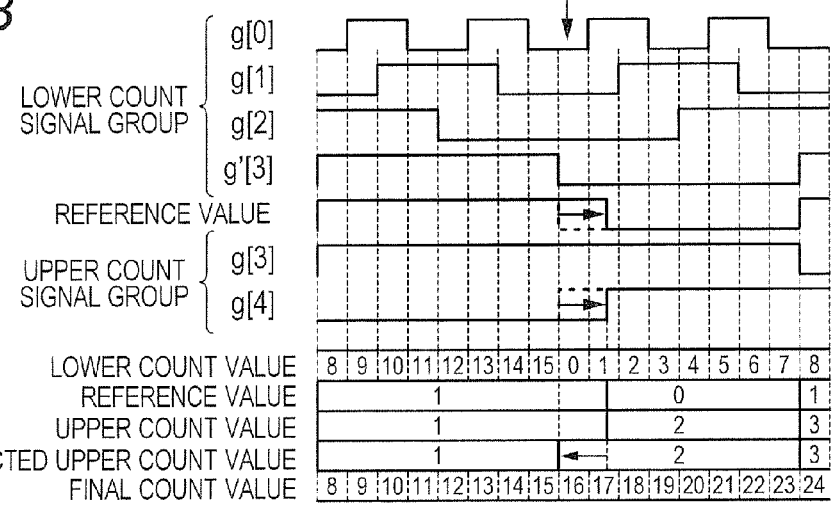
FIG. 8B ABNORMAL (UPPER COUNT: DELAYING)
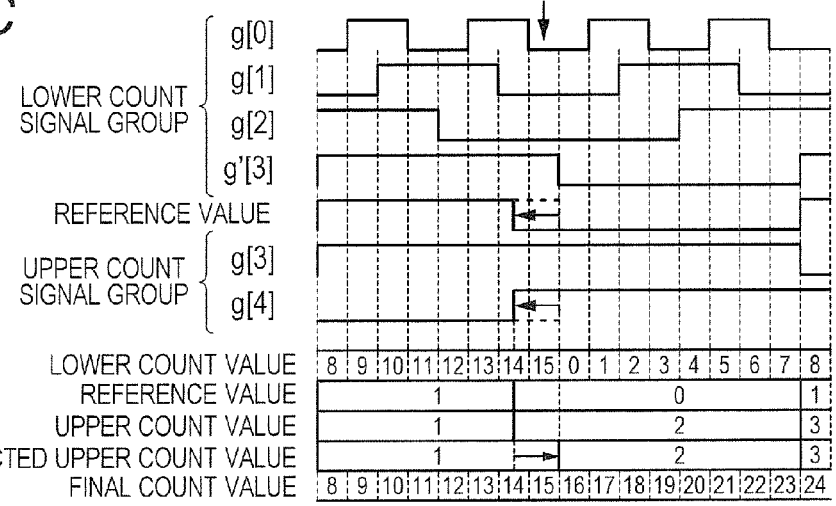
FIG. 8C ABNORMAL (UPPER COUNT: ADVANCING)

SOLID-STATE IMAGING DEVICE WITH CORRECTION OF A LOWER COUNT VALUE OR UPPER COUNT VALUE

BACKGROUND OF THE INVENTION

Field of the Invention

The present invention relates to a solid-state imaging device having an AD conversion unit that converts a pixel signal to a digital signal.

Description of the Related Art

As an analog-digital converter (ADC) that makes an analog-digital (AD) conversion of a signal output from each pixel of a CMOS image sensor, there is proposed a ramp-compare column ADC in which an AD conversion function is provided for each column of a pixel array. The ramp-compare column ADC has a comparator provided for each column, and a reference signal generation unit. The comparator compares the signal level of a pixel signal with the signal level of a ramp signal as a reference signal output from the reference signal generation unit. Then, a count value corresponding to a time that elapses before the magnitude relationship between the signal level of the pixel signal and the signal level of the ramp signal is reversed is held as digital data in a column memory provided for each column.

For example, Japanese Patent Application Laid-Open No. 2013-085103 teaches that plural count signals indicating a count value are output from a counter, and the count signals at the timing of inverting the magnitude relationship between the signal level of the pixel signal and the signal level of the ramp signal is held in a storage unit for each column.

Recently, the demands to increase the speed of a count signal from a standpoint of speeding up readout operation, and to increase the scale of a column circuit from a standpoint of enhancing the definition have been increased. Therefore, a delay difference between bits and a variation in duty ratio of a count signal have largely affected the image quality, and hence the quality of the count signal has been required to be managed more appropriately.

SUMMARY OF THE INVENTION

An object of the present invention to provide a solid-state imaging device capable of suppressing the degradation of image quality caused by a delay difference between bits and a variation in duty ratio of a count signal used for AD conversion.

According to one aspect of the present invention, there is provided a solid-state imaging device including a plurality of pixels arranged to form a plurality of columns, each of the plurality of pixels generating a pixel signal corresponding to an amount of incident light by photoelectric conversion, a plurality of comparators provided for the plurality of columns, each of the plurality of comparators comparing the pixel signal and a reference signal varying with time and outputting a control signal when a magnitude relationship between the pixel signal and the reference signal is inverted, a counter circuit unit that outputs an N-bit count signal (wherein N is a natural number) indicative of an elapsed time from a start of varying the reference signal, a plurality of memory units provided for the plurality of columns, each of the plurality of memory units holding each bit of the count signal at a time when the control signal is output, and a correction processing unit that corrects either of a lower count value and an upper count value according to a relationship between the lower count value represented by a lower count signal group including a least significant bit to an M-th bit (wherein M is a natural number of less than N) of the count signal and the upper count value represented by an upper count signal group including an (M+1)-th bit to an N-th bit of the count signal, wherein the lower count signal group comprises an M-bit Gray code count signal from the least significant bit to the M-th bit of the count signal, and a binary code count signal of the (M+1)-th bit of the count signal, and the upper count signal group comprises an (N-M) bit Gray code signal whose least significant bit is the (M+1)-th bit of the count signal.

According to another aspect of the present invention, there is provided a method for driving a solid-state imaging device including a plurality of pixels arranged to form a plurality of columns, each of the plurality of pixels generating a pixel signal corresponding to an amount of incident light by photoelectric conversion, a plurality of comparators provided for the plurality of columns, each of the plurality of comparators comparing the pixel signal and a reference signal varying with time and outputting a control signal when a magnitude relationship between the pixel signal and the reference signal is inverted, a counter circuit unit that outputs an N-bit count signal (wherein N is a natural number) indicative of an elapsed time from a start of varying the reference signal, and a plurality of memory units provided for the plurality of columns, each of the plurality of memory units holding each bit of the count signal at a time when the control signal is output, the method including acquiring a lower count value represented by a lower count signal group including a least significant bit to an M-th bit (wherein M is a natural number of less than N) of the count signal and an upper count value represented by an upper count signal group including an (M+1)-th bit to an N-th bit of the count signal, and correcting either of the lower count value and the upper count value according to a relationship between the lower count value and the upper count value, wherein the lower count signal group comprises an M-bit Gray code count signal from the least significant bit to the M-th bit of the count signal, and a binary code count signal of the (M+1)-th bit of the count signal, and the upper count signal group comprises an (N-M) bit Gray code signal whose least significant bit is the (M+1)-th bit of the count signal.

Further features of the present invention will become apparent from the following description of exemplary embodiments with reference to the attached drawings.

BRIEF DESCRIPTION OF THE DRAWINGS

FIGS. 7A, 7B, 7C, 8A, 8B and 8C are timing charts for describing a processing method for correcting a count value according to the first embodiment of the present invention.

DESCRIPTION OF THE EMBODIMENTS

Preferred embodiments of the present invention will now be described in detail in accordance with the accompanying drawings.

First Embodiment

Figure 1:
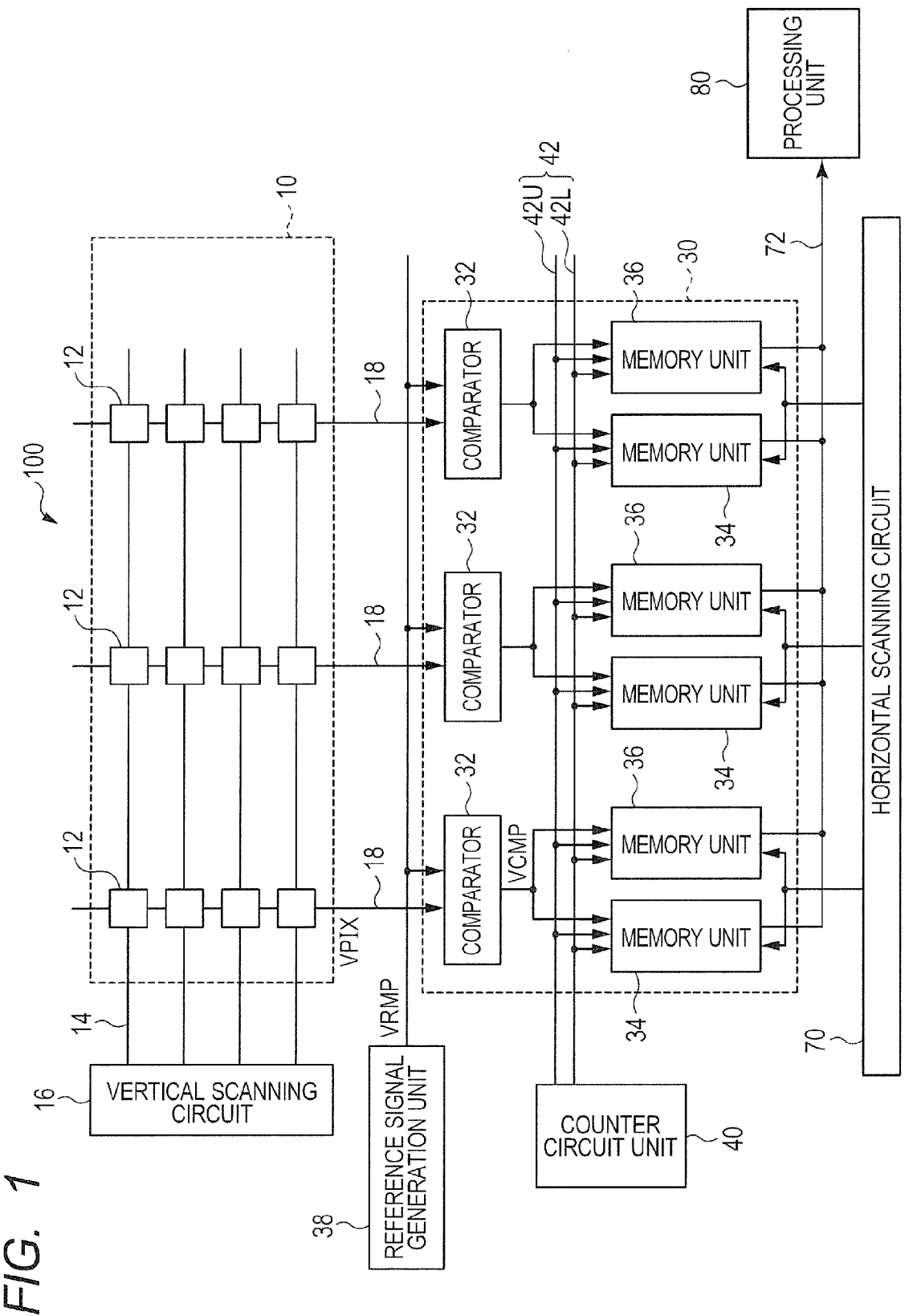
FIG. 1 is a block diagram illustrating a schematic configuration of a solid-state imaging device according to a first embodiment of the present invention.
Figure 2:
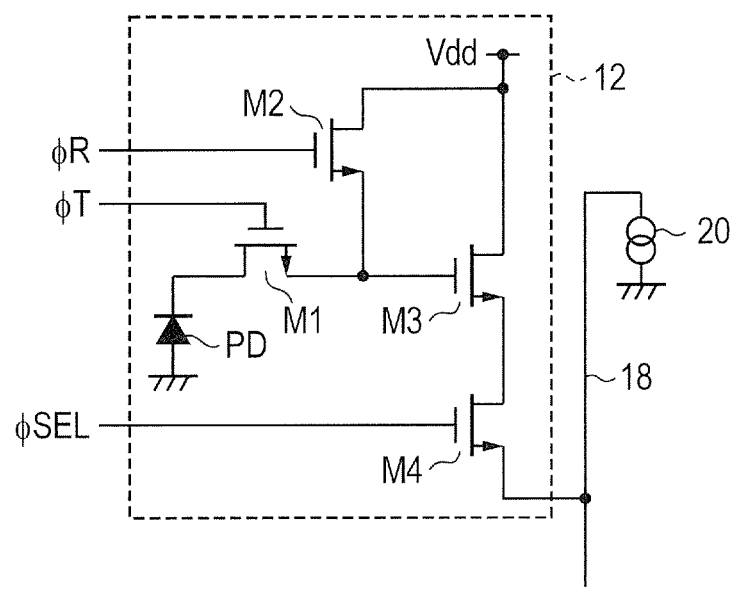
FIG. 2 is a circuit diagram illustrating an example of a pixel in the solid-state imaging device according to the first embodiment of the present invention.
Figure 3:
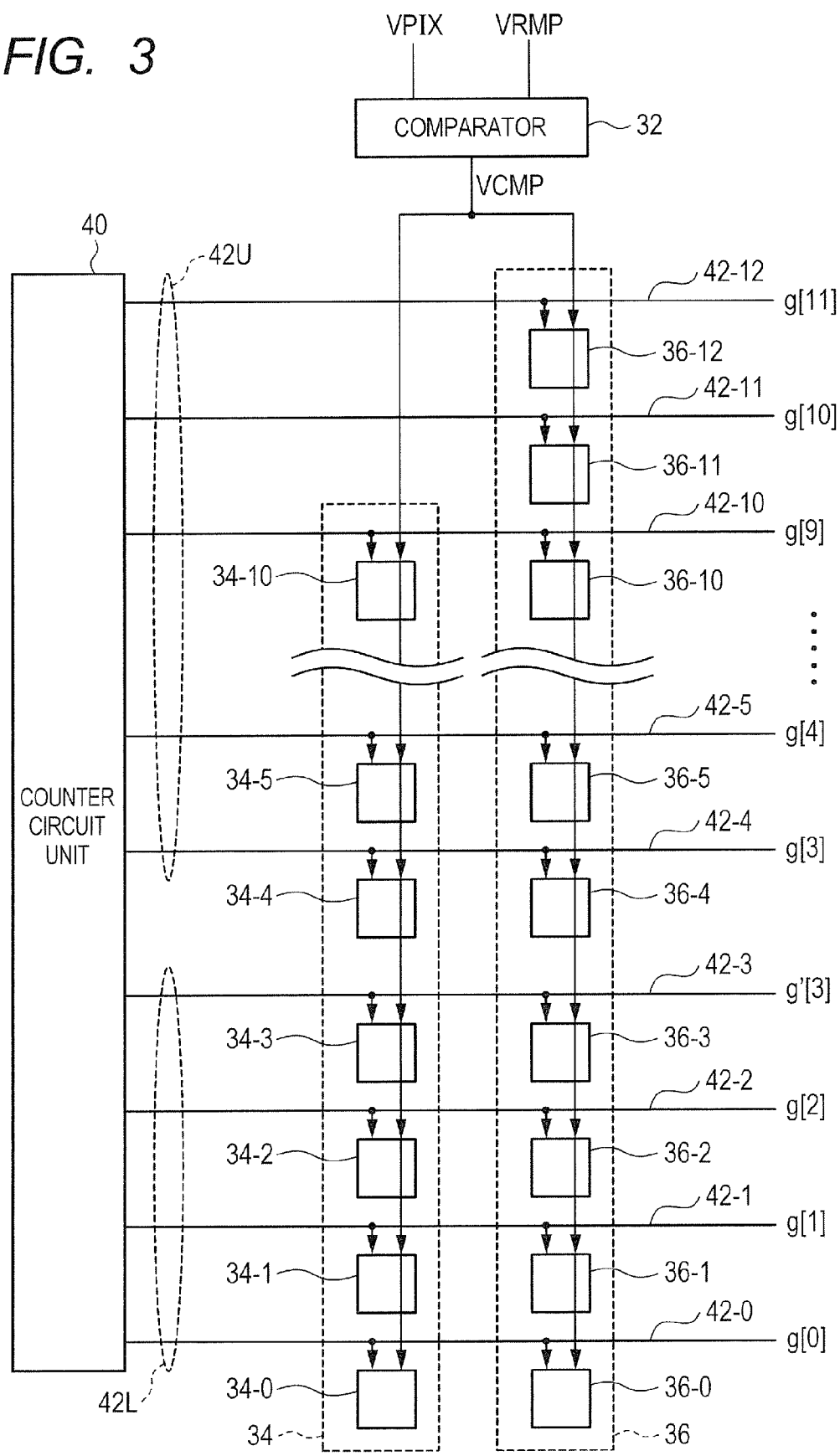
FIG. 3 is a block diagram illustrating a configuration example of an AD conversion unit in the solid-state imaging device according to the first embodiment of the present invention.
Figure 4:
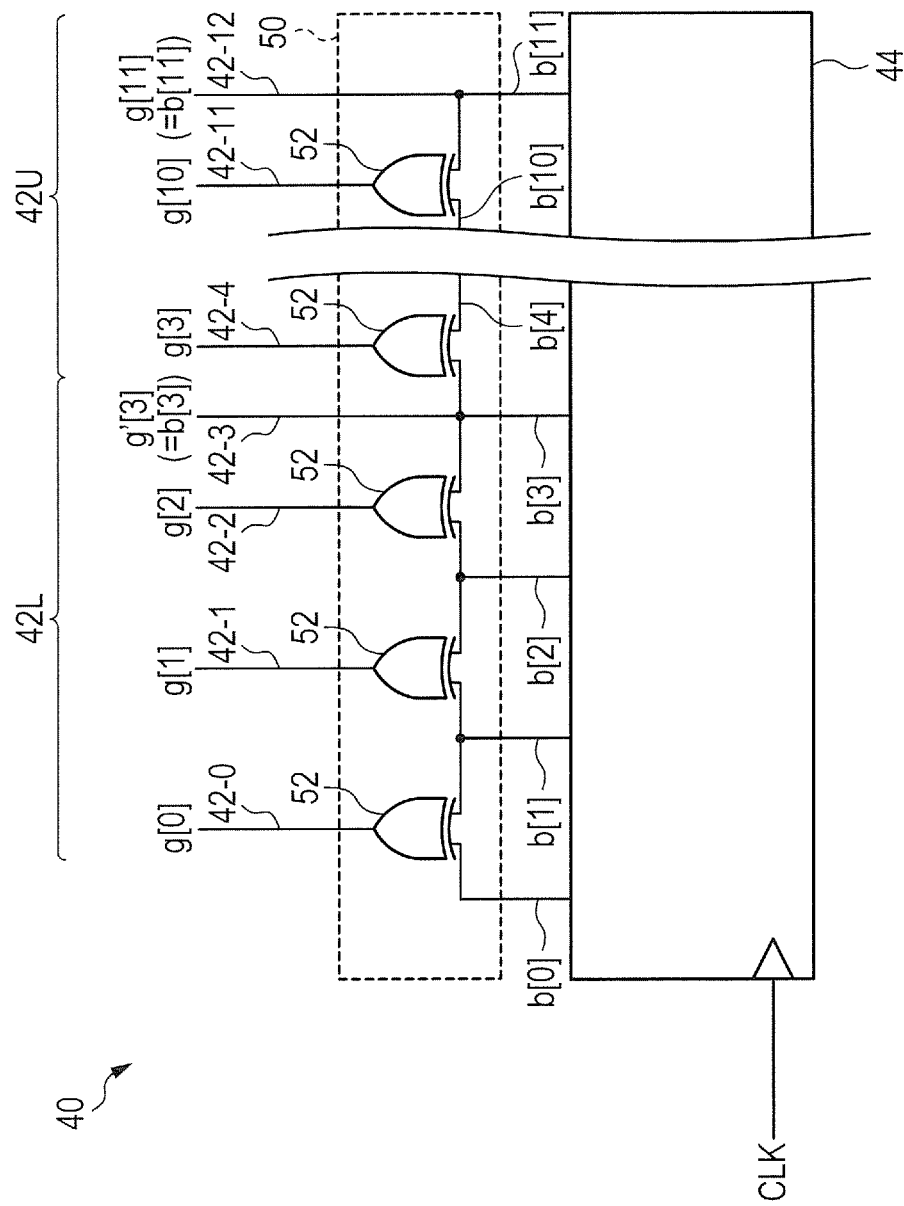
FIG. 4 is a circuit diagram illustrating a configuration example of a counter circuit unit in the solid-state imaging device according to the first embodiment of the present invention.
Figures 5A, 5B:
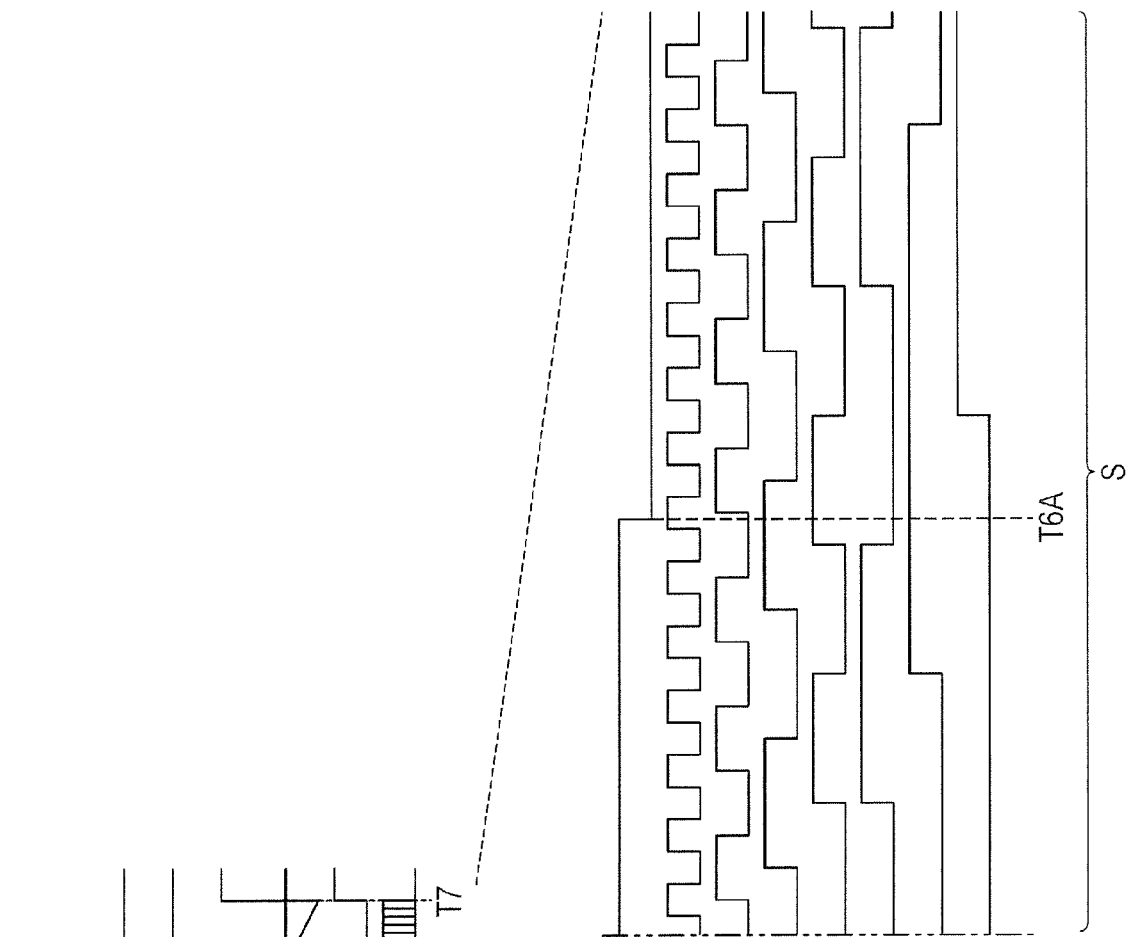
FIGS. 5A and 5B are timing charts illustrating the operation of the solid-state imaging device according to the first embodiment of the present invention.
Figure 6A:
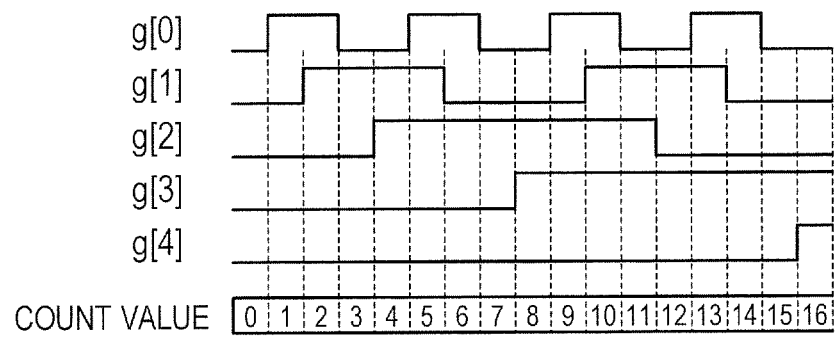
FIGS. 6A, 6B and 6C are schematic charts illustrating the relationship between a misalignment of bits of a count signal and a count value.
Figure 6B:
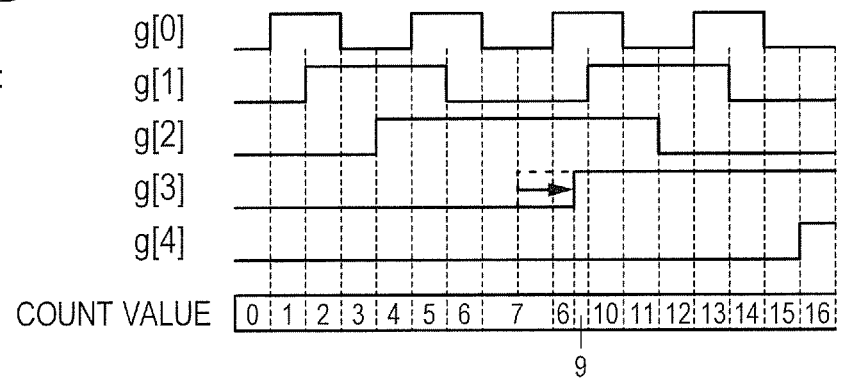
Figure 6C:
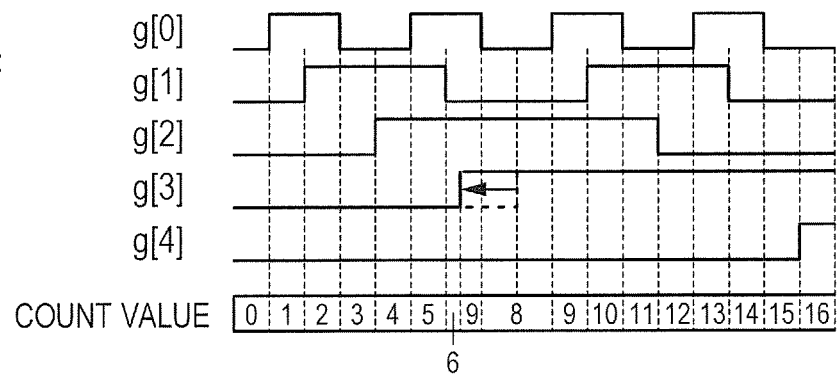

A solid-state imaging device according to a first embodiment of the present invention will be described with reference to FIG. 1 to FIG. 8C. FIG. 1 is a block diagram illustrating a schematic configuration of the solid-state imaging device according to the present embodiment. FIG. 2 is a circuit diagram illustrating an example of a pixel in the solid-state imaging device according to the present embodiment. FIG. 3 is a block diagram illustrating a configuration example of an AD conversion unit in the solid-state imaging device according to the present embodiment. FIG. 4 is a circuit diagram illustrating a configuration example of a counter circuit unit in the solid-state imaging device according to the present embodiment. FIG. 5A and FIG. 5B are timing charts illustrating the operation of the solid-state imaging device according to the present embodiment. FIG. 6A to FIG. 6C are schematic charts illustrating the relationship between a misalignment of a count signal and a count value. FIG. 7A to FIG. 8C are timing charts for describing a processing method for correcting a count value according to the present embodiment.

First, the schematic configuration of the solid-state imaging device according to the present embodiment will be described with reference to FIG. 1 to FIG. 4.

As illustrated in FIG. 1, a solid-state imaging device 100 according to the present embodiment includes a pixel array 10, a vertical scanning circuit 16, an AD conversion unit 30, a reference signal generation unit 38, a counter circuit unit 40, a horizontal scanning circuit 70, and a processing unit 80.

The pixel array 10 includes a plurality of pixels 12 arranged in a matrix of plural rows and plural columns. Each of the plurality of pixels 12 generates a pixel signal corresponding to amount of incident light by photoelectric conversion.

As illustrated in FIG. 2, the pixel 12 includes a photoelectric conversion unit PD, a transfer transistor M1, a reset transistor M2, an amplifier transistor M3, and a select transistor M4. The photoelectric conversion unit PD is, for example, a photodiode. The anode of the photodiode that constitutes the photoelectric conversion unit PD is connected to the ground voltage line, and the cathode thereof is connected to the source of the transfer transistor M1. The drain of the transfer transistor M1 is connected to the source of the reset transistor M2 and the gate of the amplifier transistor M3. A connection node of the drain of the transfer transistor M1, the source of the reset transistor M2, and the gate of the amplifier transistor M3 forms a floating diffusion node (hereinafter, referred to as "FD node"). The drain of the reset transistor M2 and the drain of the amplifier transistor M3 are connected to a power voltage line (voltage Vdd). The source of the amplifier transistor M3 is connected to the drain of the select transistor M4.

A control signal line 14 is arranged in each row of the pixel array 10 to extend in the row direction (the lateral direction in FIG. 1), respectively. The control signal line 14 is a signal line common to pixels 12 arranged in the row direction. The control signal line 14 is connected to the vertical scanning circuit 16. A predetermined control signal is output from the vertical scanning circuit 16 to the control signal line 14 at predetermined timing to drive a pixel readout circuit in each of the pixels 12. Although one control signal line 14 for each row is illustrated in FIG. 1, two or more control signal lines are typically included in each row. In the case of the pixel circuit of FIG. 2, each of the control signal line 14 includes a transfer gate signal line connected to the gate of the transfer transistor M1, a reset signal line connected to the gate of the reset transistor M2, and a select signal line connected to the gate of the select transistor M4. A control signal ϕT for driving the transfer transistor M1 is output from the vertical scanning circuit 16 to the transfer gate signal line. A control signal ϕR for driving the reset transistor M2 is output from the vertical scanning circuit 16 to the reset signal line. A control signal ϕSEL for controlling the select transistor M4 is output from the vertical scanning circuit 16 to the select signal line.

A vertical output line 18 is arranged in each column of the pixel array 10 to extend in the column direction (the longitudinal direction in FIG. 1), respectively. The vertical output line 18 is connected to the source of the select transistor M4 of each of pixels 12 arranged in the column direction, which is a signal line common to these pixels 12. The vertical output line 18 is connected to the ground voltage line via a current source 20.

As illustrated in FIG. 1, the AD conversion unit includes a comparator 32, and memory units 34, 36 corresponding to each column of the pixel array 10, respectively. The vertical output line 18 for a corresponding column and the reference signal generation unit 38 are connected to two input terminals of the comparator 32. Thus, an output signal (pixel signal VPIX) of the pixel 12 and an output signal (reference signal VRAMP) of the reference signal generation unit 38 are input to the comparator 32.

The comparator 32 in a corresponding column, the counter circuit unit 40, and the horizontal scanning circuit 70 are connected to the memory unit 34 and memory unit 36, respectively. A plurality of count signal lines 42 to output a count signal from the counter circuit unit 40 to the memory unit 34 and the memory unit 36 include a lower count signal line group 42L and an upper count signal line group 42U. The lower count signal line group 42L is a signal line group to output lower bit information of the count signal. The upper count signal line group 42U is a signal line group to output upper bit information of the count signal. Thus, an output signal VCMP of the comparator 32, the count signal from the counter circuit unit 40, and the control signal from the horizontal scanning circuit 70 are input to the memory unit 34 and the memory unit 36. The output terminals of the memory unit 34 and the memory unit 36 are connected to the processing unit 80 via an output line 72.

FIG. 3 illustrates a more specific configuration of one column of the AD conversion unit 30. Here, an example where the resolution of the AD conversion is 12 bits will be described, but the resolution of AD conversion can be changed appropriately as necessary. The number of count signal lines 42 and the number of latch circuits to be described later are changed appropriately according to the resolution of the AD conversion.

The lower count signal line group 42L contains count signal lines 42-0, 42-1, 42-2, and 42-3. Count signals g[0], g[1], g[2], and g'[3] are output from the counter circuit unit 40 to the count signal lines 42-0, 42-1, 42-2, and 42-3, respectively. The count signals g[0], g[1], g[2], and g'[3] constitute a 4-bit count signal with the count signal g[0] as the least significant bit and the count signal g'[3] as the most significant bit. In this specification, the count signals g[0], g[1], g[2], and g'[3] may also be described as a lower count signal group.

The upper count signal line group 42U contains count signal lines 42-4, 42-5, 42-6, 42-7, 42-8, 42-9, 42-10, 42-11, and 42-12. Count signals g[3] to g[11] are output from the counter circuit unit 40 to the count signal lines 42-4 to 42-12, respectively. The count signals g[3] to g[11] constitute a 12-bit Gray code count signal together with the count signals g[0] to g[2] of the lower count signal line group 42L. In this specification, the count signals g[3] to g[11] may also be described as an upper count signal group.

The memory unit 34 includes 11 latch circuits 34-0, 34-1, 34-2, 34-3, 34-4, 34-5, 34-6, 34-7, 34-8, 34-9, and 34-10. The latch circuits 34-0 to 34-10 are connected to the output terminal of the comparator 32, respectively. Further, the count signal lines 42-0 to 42-10 are connected to the latch circuits 34-0 to 34-10, respectively. Thus, count signals g[0] to g'[3] corresponding to all four bits of the lower count signal group, and count signals g[3] to g[9] corresponding to the lower seven bits of the upper count signal group are input to the memory unit 34 together with the output signal VCMP of the comparator 32.

The memory unit 36 includes 13 latch circuits 36-0, 36-1, 36-2, 36-3, 36-4, 36-5, 36-6, 36-7, 36-8, 36-9, 36-10, 36-11, and 36-12. The latch circuits 36-0 to 36-12 are connected to the output terminal of the comparator 32, respectively. Further, the count signal lines 42-0 to 42-12 are connected to the latch circuits 36-0 to 36-12, respectively. Thus, the count signals g[0] to g[11] are input to the memory unit 36 together with the output signal VCMP of the comparator 32.

FIG. 4 is a circuit diagram illustrating a configuration example of the counter circuit unit 40. The counter circuit unit 40 illustrated in FIG. 4 includes a synchronous binary counter 44 and a Gray code processing unit 50. The binary counter 44 generates 12-bit binary signals b[0] to b[11] in sync with a clock signal CLK. The Gray code processing unit 50 has 11 logical gates 52, which performs exclusive-OR operation on respective adjacent bits, i.e., adjacent binary signals b[0] to b[11], respectively. The Gray code processing unit 50 outputs the 12-bit Gray code count signals g[0] to g[11] as the outputs of these 11 logical gates 52 and the binary signal b[11] as the most significant bit.

The count signals g[0] to g[2] generated by the Gray code processing unit 50, and the count signal g'[3] that is the binary signal b[3] generated by the binary counter 44 constitute the lower count signal group. These lower count signal group g[0] to g[2], and g'[3] are output to the count signal lines 42-0 to 42-2, 42-3 constituting the lower count signal line group 42L, respectively.

The count signals g[3] to g[10] generated by the Gray code processing unit 50, and the count signal g[11] that is the binary signal b[11] generated by the binary counter 44 constitute the upper count signal group. These upper count signal group g[3] to g[11] are output to the count signal lines 42-4 to 42-12 constituting the upper count signal line group 42U, respectively.

The counter circuit unit 40 may further include a flip-flop circuit or the like in the subsequent stage of the Gray code processing unit 50 to align the phases of all the count signals with one another.

In the present embodiment, the plural bits of the count signals are divided into the lower count signal group and the upper count signal group to manage the edge relationship between the count signals that constitute each count signal group, individually. This reduces the number of signal lines to be managed, compared with a case where all the count signals are managed uniformly, and hence the quality management of the count signals is made easy. Here, the term "management" means such a management that the amount of delay and duty ratio of all of the count signals will not affect the linearity of AD conversion. Since the width of one LSB becomes narrower as the speed is higher, a minor deviation in the amount of delay or the duty ratio can ruin the linearity and hence affect the image quality.

Therefore, in the design of count signal lines, it is required that the amount of delay and the duty ratio of all the count signal lines should be made uniform. To this end, not only does the count signal lines need to be laid out so that parasitic capacitance and parasitic resistance based on all the count signal lines will be the same, but also the performance of buffer circuits that output and deliver all signals needs to match with one another. Therefore, as the count signals are speeded up or the number of count signal lines increases, i.e., as high definition progresses, it becomes difficult to match the above-mentioned parasitic element and buffer performance for a dozen or all of the count signal lines.

On this point, since the plural bits of the count signals are divided into the lower count signal group and the upper count signal group to manage (design) the count signals in the present embodiment, the number of respective count signal lines can be reduced, and hence the management can be made easy. Further, the lower count signal group high in frequency but small in number can be managed (designed) with extra care.

Note that the grouping of the count signal lines illustrated in the present embodiment is based on the assumption that the number of lines to manage high-speed count signals is four. It is desired to set the number of count signal lines included in the lower count signal line group 42L according to the number of lines to manage the high-speed count signals.

Next, the basic operation of the solid-state imaging device 100 according to the present embodiment will be described with reference to FIG. 5A and FIG. 5B. FIG. 5A and FIG. 5B are timing charts illustrating the operation of the solid-state imaging device 100 according to the present embodiment. FIG. 5A is a timing chart illustrating the entire operation, and FIG. 5B illustrates the details of count signals (Count in FIG. 5A).

First, a control signal φSEL (not illustrated) for a row to be read out in the pixel array 10 is changed by the vertical scanning circuit 16 from a low level to a high level to turn on the select transistor M4 of each of the pixels 12 in the row. This causes each of the amplifier transistors M3 of the pixels 12 belonging to the selected row to be in a state of being supplied with bias current from the current source 20 through each of the select transistors M4, forming a source-follower circuit.

Then, during a period from time T0 to time T1, the vertical scanning circuit 16 changes a control signal φR output to the control signal line 14 from the low level to the high level to turn on the reset transistor M2. This causes power voltage Vdd to be applied to the FD node via the reset transistor M2 so as to reset the potential of the FD node to a predetermined reset voltage according to the power voltage Vdd.

At this time, since the amplifier transistor M3 forms part of the source-follower circuit, a signal (reset signal) corresponding to the reset voltage of the FD node is output to the vertical output line 18 via the select transistor M4. In FIG. 5A, a pixel signal VPIX indicates the level of a signal output from the pixel 12 to the vertical output line 18.

Then, during a period from time T2 to time T3, AD conversion processing is performed on this reset signal.

During the period from time T2 to time T3, the reference signal generation unit 38 varies the signal level of a reference signal VRMP with time at a constant rate. Here, an example in which the signal level of the reference signal VRMP is gradually reduced is illustrated, but the signal level of the reference signal VRMP may be gradually increased. The counter circuit unit 40 starts counting at the same time as the start of variation in the signal level of the reference signal VRMP, and outputs Gray code count signals g[0] to g[11] corresponding to count values from the count signal lines 42-0 to 42-12 (see FIG. 5B). The count signal lines 42-0 to 42-12 output an N-bit (12-bit here) count signal indicative of the elapsed time from the start of varying the reference signal VRMP.

The pixel signal VPIX and the reference signal VRMP are input to the comparator 32, and the comparator 32 compares the signal levels. The comparator 32 compares the pixel signal VPIX and the reference signal VRMP and inverts the signal level of the output signal VCMP when the magnitude relationship therebetween is reversed. In the example of FIG. 5A, the signal level of the reference signal VRMP is lower than the signal level of the pixel signal VPIX at time T2A. Therefore, the comparator 32 changes the signal level of the output signal VCMP from the high level to the low level at time T2A.

Each of the latch circuits 34-0 to 34-10 in the memory unit 34 holds, as a result of the AD conversion of the reset signal, the value of each of the count signals g[0] to g[9] from each of the count signal lines 42-1 to 42-10 at the time when the signal level of the output signal VCMP is changed, respectively. In this sense, the output signal VCMP of the comparator 32 changed at time T2A is a control signal that controls the memory unit 34. In other words, each of the latch circuits 34-0 to 34-10 holds each bit of the count signal at the time when the control signal is output. Note that the period from time T2 to time T3 as the period in which the AD conversion of the reset signal is performed is illustrated as a conversion period N in FIG. 5A and FIG. 5B.

Next, during a period from time T4 to time T5, the vertical scanning circuit 16 changes the control signal φT from the low level to the high level to turn on the transfer transistor M1. This causes signal charge, generated in the photoelectric conversion unit PD in response to light input, to be transferred to the FD node.

At this time, since the amplifier transistor M3 forms part of the source-follower circuit, a signal (optical signal) corresponding to the amount of signal charge transferred to the FD node is output to the vertical output line 18 via the select transistor M4. Thus, the signal level of the pixel signal VPIX indicative of the signal level of the optical signal becomes lower than the signal level of the reset signal.

Then, during a period from time T6 to time T7, AD conversion processing for this optical signal is performed.

The reference signal generation unit 38 varies the signal level of the reference signal VRMP with time at a constant rate during the period from time T6 to time T7. Here, an example in which the signal level of the reference signal VRMP is gradually reduced is illustrated, but the signal level of the reference signal VRMP may be gradually increased. The counter circuit unit 40 starts counting at the same time as the start of variation in the signal level of the reference signal VRMP, and outputs Gray code count signals g[0] to g[11] corresponding to count values from the count signal lines 42-0 to 42-12 (see FIG. 5B).

The pixel signal VPIX and the reference signal VRMP are input to the comparator 32, and the comparator 32 compares the signal levels. The comparator 32 compares the pixel signal VPIX and the reference signal VRMP and inverts the signal level of the output signal VCMP when the magnitude relationship therebetween is reversed. In the example of FIG. 5A, the signal level of the reference signal VRMP is lower than the signal level of the pixel signal VPIX at time T6A. Therefore, the comparator 32 changes the signal level of the output signal VCMP from the high level to the low level at time T6A.

Each of the latch circuits 36-0 to 36-12 in the memory unit 36 holds, as a result of the AD conversion of the optical signal, the value of each of the count signals g[0] to g[11] from each of the count signal lines 42-1 to 42-12 at the time when the signal level of the output signal VCMP is changed, respectively. In this sense, the output signal VCMP of the comparator 32 changed at time T6A is a control signal that controls the memory unit 36. In other words, each of the latch circuits 36-0 to 36-12 holds each bit of the count signal at the time when the control signal is output. Note that the period from time T6 to time T7 as the period in which the AD conversion of the optical signal is performed is illustrated as a conversion period S in FIG. 5A and FIG. 5B.

The results of the AD conversion of the reset signal held in the memory unit 34, and the results of the AD conversion of the optical signal held in the memory unit 36 are output to the processing unit 80 through the output line 72 sequentially according to the control signals from the horizontal scanning circuit 70 to the memory units 34, 36. Though the detailed description will be omitted here, it is common practice to perform digital correlated double sampling (digital CDS) processing in the solid-state imaging device so as to subtract digital data on the reset signal from digital data on the optical signal.

After that, similar processing is performed sequentially on each row of the pixel array 10 to acquire image data corresponding to the pixel array 10.

Next, a correction processing method for the results of the AD conversion of Gray code count signals held in the memory units 34, 36 will be described with reference to FIG. 6A to FIG. 8C. The correction processing for the AD conversion results may be performed inside the solid-state imaging device 100 (e.g., by the processing unit 80), or may be performed outside the solid-state imaging device 100 (e.g., by an output signal processing unit in an imaging system to be described later). Further, a correction processing unit may be provided inside the AD conversion unit 30 to perform correction processing in the AD conversion unit 30 before readout into the processing unit 80 via the output line 72. When the processing unit 80 performs the correction processing for the AD conversion results, the processing unit 80 becomes the correction processing unit that performs the correction processing for the AD conversion results.

FIG. 6A to FIG. 6C illustrate an example of the count values obtained by the AD conversion processing mentioned above. FIG. 6A illustrates a case where a count signal is output from each signal line 42 at proper timing. FIG. 6B illustrates a case where an upper count signal is delayed (the rise of the count signal g[3] is delayed). FIG. 6C illustrates a case where an upper count signal is advanced (the rise of the count signal g[3] is advanced). In FIG. 6A to FIG. 6C, the count signals g[0] to g[4] indicate five bits from the least significant bit of the Gray code count signals. In a table below each chart, values of the AD conversion results held in the memory units 34, 36 after being subjected to binary code conversion are illustrated as the count values.

When the positional relationship among the edges of the count signals g[0] to g[4] is proper, appropriate count values can be obtained according to the lapse of time as illustrated in FIG. 6A.

However, for example, if the anteroposterior relationship between the edge of the count signal g[3] and the edge of the count signal g[0] is reversed as illustrated in FIG. 6B and FIG. 6C, proper count values cannot be obtained. In these cases, the sequence of count values after being subjected to binary code conversion is changed or a value is missing as illustrated in the table below each chart to deteriorate the linearity of AD conversion, resulting in an adverse effect on the image quality.

FIG. 7A to FIG. 7C illustrate the timing relationships between the rising edges of the lower count signal group (the count signals g[0], g[1], g[2], and g'[3]) and the upper count signal group (the count signals g[3] and g[4]) when the final count value is 0 to 16. FIG. 7A illustrates a case where a count signal is output from each signal line 42 at proper timing. FIG. 7B illustrates a case where an upper count signal is delayed. FIG. 7C illustrates a case where an upper count signal is advanced.

In FIG. 7A to FIG. 7C, the reference value indicates a value of the least significant bit of the upper count signal group after being subjected to binary code conversion. In the lower table of FIG. 7A, a count value of the lower count signal group after being subjected to binary code conversion (lower count value), the reference value, a count value of the upper count signal group after being subjected to binary code conversion (upper count value), and a final count value as the final results after the correction are illustrated. Further, in each of the lower tables of FIG. 7B and FIG. 7C, the lower count value, the reference value, the upper count value, the corrected upper count value, and the final count values are illustrated.

The final count value in the state of FIG. 7A, where all the count signals are changed at desired timings, is the expected value when a correction is made. The conditions required for correction are the cases where the relationship between the reference value and the lower count value does not match the following combinations:

1) The lower count value is 0 to 7, when the reference value is 0, and
2) The lower count value is 8 to 15, when the reference value is 1.

FIG. 7B illustrates a case where the edge of the count signal g[3] in the upper count signal group is delayed by a time corresponding to about 1.5 [LSB].

For example, when the count signal is held at timing indicated by the arrow in FIG. 7B, the lower count value is "8" (the binary value is "1000"), and the reference value is "0." Since this does not match any of the above combinations, correction processing is required. In this case, the correction processing is performed to obtain the final count value as follows:

$$\text{Final count value} = (\text{upper count value} + 1) \times 8 +$$
$$(\text{lower 3 bits ``000'' of lower count value})$$
$$= (0 + 1) \times 8 + 0$$
$$= 8$$

As a result of the above correction processing, it is found that the final count value becomes a value equal to "8" as the expected value illustrated in FIG. 7A. To correct the time delay for the upper count signal, "1" is added to the upper count value and shifted by 3 bits (i.e., multiplied by 8), and further the value of the lower 3 bits of the lower count value is added to obtain the final count value.

The similar processing is performed when the lower count value is "8" to "11" and the reference value is "0."

FIG. 7C illustrates a case where the edge of the count signal g[3] in the upper count signal group is advanced by a time corresponding to about 1.5 [LSB].

When the count signal is held at timing indicated by the arrow in FIG. 7C, the lower count value is "7" (the binary value is "0111"), and the reference value is "1." Since this does not match any of the above combinations, correction processing is required. In this case, the correction processing is performed to obtain the final count value as follows:

$$\text{Final count value} = (\text{upper count value} - 1) \times 8 +$$
$$(\text{lower 3 bits ``111'' of lower count value})$$
$$= (1 - 1) \times 8 + 7$$
$$= 7$$

As a result of the above correction processing, it is found that final count value becomes a value equal to "7" as the expected value illustrated in FIG. 7A.

To correct the time advance for the upper count value, "1" is subtracted from the upper count value and shifted by 3 bits (i.e., multiplied by 8), and further the value of the lower 3 bits of the lower count value is added to obtain the final count value.

The similar processing is performed when the lower count value is "4" to "7" and the reference value is "1."

Although the example of correcting the upper count value is described here, the lower count value may be corrected to match any of the above combinations. In this case, when the relationship mismatches any of the above combinations, the upper count value and the lower count value may be added after "8" is added to the lower count value (in the case of FIG. 7B) or subtracted from the lower count value (in the case of FIG. 7C).

FIG. 8A to FIG. 8C illustrate the timing relationships between the rising edges of the lower count signal group (the count signals g[0], g[1], g[2], and g'[3]) and the upper count signal group (the count signals g[3] and g[4]) when the final count value is 8 to 24. FIG. 8A illustrates a case where a count signal is output from each signal line 42 at proper timing. FIG. 8B illustrates a case where an upper count signal is delayed. FIG. 8C illustrates a case where an upper count signal is advanced.

In FIG. 8A to FIG. 8C, the reference value indicates a value of the least significant bit of the upper count signal group after being subjected to binary code conversion. In the lower table of FIG. 8A, a count value of the lower count signal group after being subjected to binary code conversion (lower count value), the reference value, a count value of the upper count signal group after being subjected to binary code conversion (upper count value), and a final count value as the final results after the correction are illustrated. Further, in each of the lower tables of FIG. 8B and FIG. 8C, the lower count value, the reference value, the upper count value, the corrected upper count value, and the final count values are illustrated.

The final count value in the state of FIG. 8A, where all the count signals are changed at desired timings, is the expected value when a correction is made. The relationship between the reference value and the lower count value, in which correction is required, is the same as that of the above-mentioned combinations.

FIG. 8B illustrates a case where the edge of the count signal g[4] in the upper count signal group is delayed by a time corresponding to about 1.5 [LSB]. When the count signal is held at timing indicated by the arrow in FIG. 8B, the lower count value is "0" (the binary value is "0000"), and the reference value is "1." Since this does not match any of the above combinations, correction processing is required. In this case, the correction processing is performed to obtain the final count value as follows:

$$\text{Final count value} = (\text{upper count value} + 1) \times 8 +$$
$$(\text{lower 3 bits "000" of lower count value})$$
$$= (1 + 1) \times 8 + 0$$
$$= 16$$

The similar processing is performed when the lower count value is "0" to "3" and the reference value is "1."

FIG. 8C illustrates a case where the edge of the count signal g[4] in the upper count signal group is advanced by a time corresponding to about 1.5 [LSB]. When the count signal is held at timing indicated by the arrow in FIG. 8C, the lower count value is "15" (the binary value is "0111"), and the reference value is "0." Since this does not match any of the above combinations, correction processing is required. In this case, the correction processing is performed to obtain the final count value as follows:

$$\text{Final count value} = (\text{upper count value} - 1) \times 8 +$$
$$(\text{lower 3 bits "111" of lower count value})$$
$$= (2 - 1) \times 8 + 7$$
$$= 7$$

The similar processing is performed when the lower count value is "12" to "15" and the reference value is "0."

Although the example of correcting the upper count value is described here, it is only necessary to correct at least either of the upper count value and the lower count value. The lower count value may be corrected to match any of the above combinations.

The correction processing described with reference to FIG. 7A to FIG. 8C can be summarized as follows:

(corresponding to the example of FIG. 8B)

Reference value=1; lower count value=0 to 3; and

Final count value=(upper count value+1)×8+(lower 3 bits of lower count value)    [Case 1]

(corresponding to the example of FIG. 7C)

Reference value=1; lower count value=4 to 7; and

Final count value=(upper count value−1)×8+(lower 3 bits of lower count value)    [Case 2]

(corresponding to the example of FIG. 7B)

Reference value=0; lower count value=8 to 11; and

Final count value=(upper count value+1)×8+(lower 3 bits of lower count value)    [Case 3]

(corresponding to the example of FIG. 8C)

Reference value=0; lower count value=12 to 15; and

Final count value=(upper count value−1)×8+(lower 3 bits of lower count value)    [Case 4]

The correctable range in the correction processing method illustrated in the present embodiment is the width of 4 [LSB] of the lower count value. This means that the range in which a misalignment between the transitional edge of the reference value and the transitional edge of a lower count value can be corrected falls within ±4 [LSB].

For example, assuming that the rising edge of the count signal g[4] is advanced by a width corresponding to 5 [LSB] in FIG. 8C, the reference value is "0" when the lower count value is "11." Since this combination corresponds to [Case 3] mentioned above, the final count value after the correction processing is as follows:

$$\text{Final count value} = (\text{upper count value} + 1) \times 8 +$$
$$(\text{lower 3 bits "100" of lower count value})$$
$$= (2 + 1) \times 8 + 3$$
$$= 27$$

Thus, it is found that the final count value becomes a value different from "11" as the expected value.

When a greater misalignment is assumed, the number of lines in the lower count signal line group increases to perform similar correction processing.

For example, if the number of lines in the lower count signal line group 42L is five, the correctable range will fall within ±8 [LSB]. However, since the number of count signal lines for edge management increases as the number of lines in the lower count signal line group 42L increases, the degree of difficulty in managing the quality of count signals increases. Therefore, it is desired to set an appropriate number of lines in the lower count signal line group 42L according to the frequency and transmission distance of each count signal.

When the above-mentioned correction processing is extended for N-bit count signals, the following description can be made.

Among N-bit count signals (where N is a natural number), the lower count signal group comprises M-bit Gray code count signal from the first bit (least significant bit) to the M-th bit (where M is a natural number of less than N), and the (M+1)-th bit of the binary code count signal of the count signal. The upper count signal group comprises (N-M) bit Gray code signal with the least significant bit as the (M+1)- th bit of the count signal. The value of the least significant bit when the upper count value is represented by the binary code is used as the reference value.

In this case, the correction processing for the count signal is performed when the relationship between the lower count value and the reference value is as follows. Namely, when the reference value is 1 and the lower count value is 0 to $2^M-2^{M-1}-1$, 1 is added to the upper count value. When the reference value is 1 and the lower count value is $2^M-2^{M1}$ to $2^{M-1}$, 1 is subtracted from the upper count value. When the reference value is 0 and the lower count value is $2^M$ to $2^M+2^{M-1}-1$, 1 is added to the upper count value. When the reference value is 1 and the lower count value is $2^M+2^{M-1}$ to $2^{M+1}-1$, 1 is subtracted from the upper count value.

After that, an M-bit count signal from the least significant bit to the M-th bit in the corrected lower count signal group is combined with an (N-M) bit count signal from the least significant bit to the (N-M)-th bit in the upper count signal group to acquire an N-bit count value.

As described above, the plurality of count signals output in common to the plurality of columns are divided into the lower count signal group and the upper count signal group to make it easy to manage the quality of each count signal. This can prevent the deterioration of the linearity that causes the degradation of the image quality.

Thus, according to the present embodiment, since the plural bits of the count signals used for AD conversion are divided into the lower count signal group and the upper count signal group, the quality of each count signal can be managed easily to make a correction as needed. This can prevent the deterioration of the linearity of AD conversion that causes the degradation of the image quality to acquire the good quality of an image.

Second Embodiment

Figure 9:
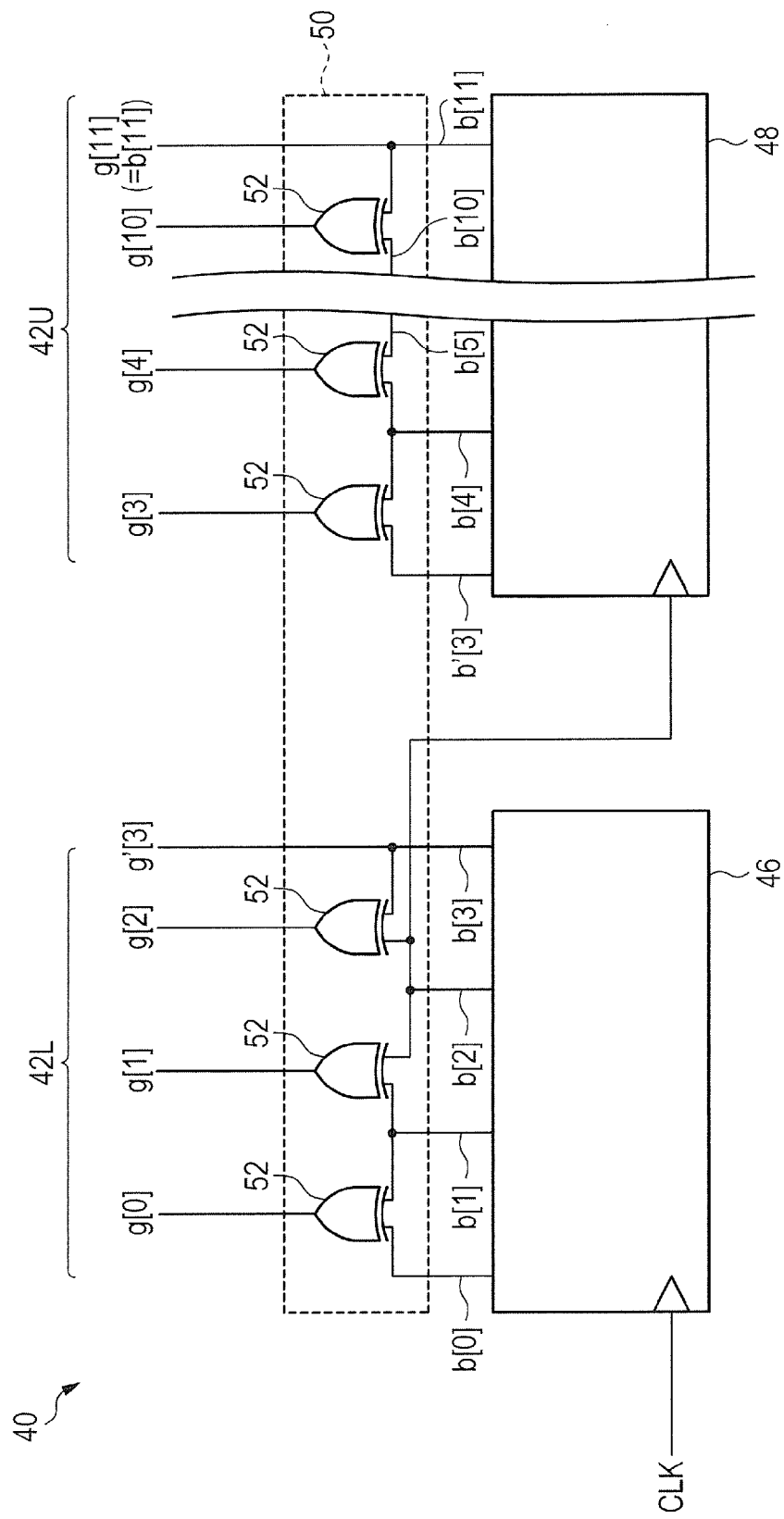
FIG. 9 is a circuit diagram illustrating a configuration example of a counter circuit unit in a solid-state imaging device according to a second embodiment of the present invention.

A solid-state imaging device according to a second embodiment of the present invention will be described with reference to FIG. 9. Similar constituent elements to those in the solid-state imaging device according to the first embodiment illustrated in FIG. 1 to FIG. 8C are given the same reference numerals to omit or simplify the description. FIG. 9 is a circuit diagram illustrating a configuration example of a counter circuit unit of the solid-state imaging device according to the present embodiment.

The solid-state imaging device according to the embodiment is the same as the solid-state imaging device according to the first embodiment except that the configuration of the counter circuit unit is different.

As illustrated in FIG. 9, a counter circuit unit in a solid-state imaging device 100 according to the present embodiment is configured to use two binary counters 46, 48 instead of the binary counter 44 in the counter circuit unit 40 of the first embodiment illustrated in FIG. 4.

The binary counter 46 is a 4-bit synchronous counter that outputs binary signals b[0] to b[3].

The lower count signal group comprises Gray code signals g[0] to g[2] generated by the Gray code processing unit 50 based on the binary signals b[0] to b[3], and a signal g'[3] that is the binary signal b[3].

The binary counter 48 is a 9-bit synchronous counter to which the binary signal b[2] as the output of the binary counter 46 is input as a clock signal CLK to output binary signals b'[3], and b[4] to b[11].

The upper count signal group comprises Gray code signals g[3] to g[10] generated by the Gray code processing unit 50 based on the binary signal b'[3] and b[4] to b[11], and a signal g[11] that is the binary signal b[11].

In general, the maximum operating frequency of a synchronous counter depends on the number of bits of the counter, and there is a tendency that the maximum operating frequency is delayed as the number of bits increases. Therefore, the use of two synchronous binary counters 44, 46 like in the present embodiment to reduce the number of bits of the binary counter 44 so as to generate a high-speed lower count signal group can make the operating frequency as the counter higher than that in the first embodiment.

Since the lower count signal group and the upper count signal group are generated by different synchronous counters, there is a possibility that the phase relationship between both count signal groups will be out of alignment. However, since the above-mentioned correction processing is performed to include this misalignment, the misalignment in phase relationship between the lower count signal group and the upper count signal group can be prevented.

Note that the counter circuit unit 40 may also include a flip-flop circuit or the like in the subsequent stage of the Gray code processing unit 50 to make all the count signals in phase.

As described above, the plurality of count signals output in common to the plurality of columns are divided into the lower count signal group and the upper count signal group to make it easy to manage the quality of each count signal. This can prevent the deterioration of the linearity that causes the degradation of the image quality.

Further, since the synchronous counters are separately provided to generate the lower count signal group and the upper count signal group, the counter operating frequency can be improved as a whole.

Thus, according to the present embodiment, since the plural bits of the count signals used for AD conversion are divided into the lower count signal group and the upper count signal group, the quality of each count signal can be managed easily and make a correction as needed. This can prevent the deterioration of the linearity of AD conversion that causes the degradation of the image quality to acquire the good quality of an image. Further, since the synchronous counter that generates the lower count signal group and the synchronous counter that generates the upper count signal group are separated, the operating frequency can be improved as a whole, and hence, the AD conversion processing can be speeded up.

Third Embodiment

Figure 10:
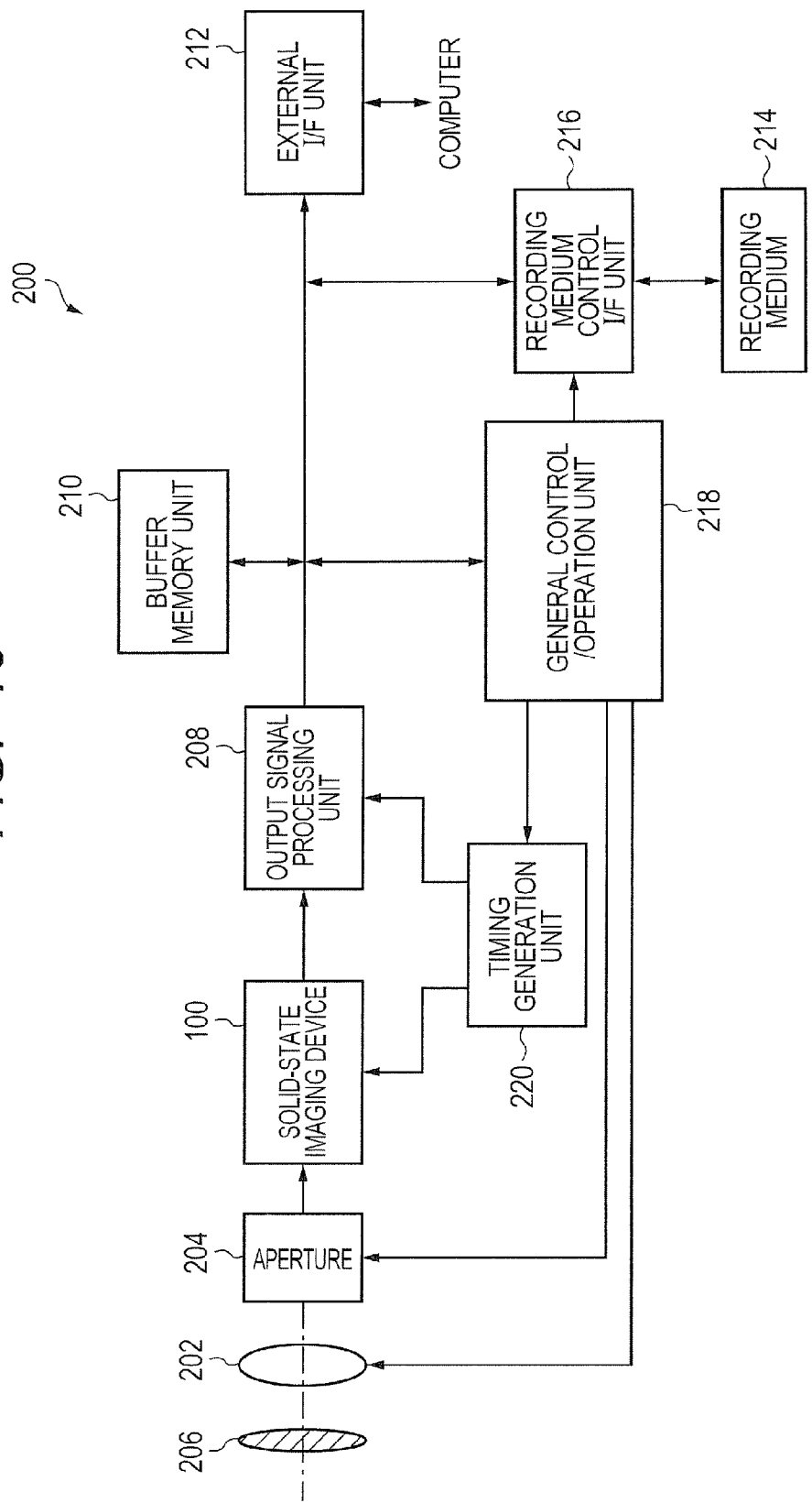
FIG. 10 is a block diagram illustrating a schematic configuration of an imaging system according to a third embodiment of the present invention.

An imaging system according to a third embodiment of the present invention will be described with reference to FIG. 10. Similar constituent elements to those in the solid-state imaging devices according to the first and second embodiments illustrated in FIG. 1 to FIG. 9 are given the same reference numerals to omit or simplify the description. FIG. 10 is a block diagram illustrating a schematic configuration of the imaging system according to the present embodiment.

The solid-state imaging devices described in the above first and second embodiments can be applied to various imaging systems. For example, applicable imaging systems include a digital still camera, a digital camcorder, and a surveillance camera. FIG. 10 illustrates a digital still camera to which the solid-state imaging device according to any of the aforementioned embodiments.

An imaging system 200 illustrated in FIG. 10 includes a solid-state imaging device 100, a lens 202 that forms an optical image of an object on the solid-state imaging device 100, an aperture 204 to make the amount of light passing through the lens 202 variable, and a barrier 206 for lens protection. The lens 202 and the aperture 204 are an optical system that focuses light on the solid-state imaging device 100. The solid-state imaging device 100 is the solid-state imaging device 100 described in the first and second embodiments.

The imaging system 200 also includes an output signal processing unit 208 that processes an output signal output from the solid-state imaging device 100. The output signal processing unit 208 makes various corrections and compression of signals as needed, and outputs the signals. The output signal processing unit 208 may have the function of performing the same correction processing as the correction processing unit in the solid-state imaging device 100 described in the first and second embodiments. In this case, the output signal processing unit 208 is a correction processing unit that performs correction processing on the AD conversion results.

The imaging system 200 further includes a buffer memory unit 210 that temporarily stores image data, and an external interface unit (external I/F unit) 212 that communicates with an external computer or the like. Further the imaging system 200 includes a recording medium 214 such as a semiconductor memory to record or read imaging data, and a recording medium control interface unit (recording medium control I/F unit) 216 that performs recording or reading onto the recording medium 214. Note that the recording medium 214 may be incorporated in the imaging system 200 or may be removable.

Further, the imaging system 200 includes a general control/operation unit 218 that controls various operations and the entire digital still camera, and a timing generation unit 220 that outputs various timing signals to the solid-state imaging device 100 and the output signal processing unit 208. Here, the timing signals and the like may be input from the outside. In this case, it is only necessary for the imaging system 200 to have at least the solid-state imaging device 100 and the output signal processing unit 208 that processes an output signal output from the solid-state imaging device 100.

The solid-state imaging device 100 according to the first and second embodiments is used to constitute an imaging system so that the degradation of the image quality caused by the deterioration of the linearity of AD conversion processing can be prevented. Thus, an imaging system capable of acquiring better images can be realized.

Alternative Embodiments

The present invention is not limited to the aforementioned exemplary embodiments, and various modifications can be made.

For example, in the solid-state imaging device 100 of the aforementioned first and second embodiments, the pixel circuit that forms pixels 12 is not limited to that illustrated in FIG. 2, and various configurations of pixel circuits used in solid-state imaging devices can be applied.

Further, in the aforementioned first and second embodiments, the plurality of bits of the count signals are divided into two signal groups, namely the lower count signal group and the upper count signal group, to perform correction processing, but the plurality of bits of the count signals may be divided into three or more signal groups to perform correction processing. In this case, for example, correction processing may be performed sequentially on every two adjacent signal groups from the lower bit side.

Further, the imaging system illustrated in the third embodiment is an example of an imaging system to which the solid-state imaging device of the present invention can be applied, and the imaging system to which the solid-state imaging device of the present invention can be applied is not limited to the configuration illustrated in FIG. 10.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-207971, filed Oct. 22, 2015, which is hereby incorporated by reference herein in its entirety.

What is claimed is:

1. A solid-state imaging device comprising:
   a plurality of pixels arranged to form a plurality of columns, each of the plurality of pixels generating a pixel signal corresponding to an amount of incident light by photoelectric conversion;
   a plurality of comparators provided for the plurality of columns, each of the plurality of comparators comparing the pixel signal and a reference signal varying with time and outputting a control signal when a magnitude relationship between the pixel signal and the reference signal is inverted;
   a counter circuit unit that outputs an N-bit count signal (wherein N is a natural number) indicative of an elapsed time from a start of varying the reference signal;
   a plurality of memory units provided for the plurality of columns, each of the plurality of memory units holding each bit of the count signal at a time when the control signal is output; and
   a correction processing unit that corrects either of a lower count value and an upper count value according to a relationship between the lower count value represented by a lower count signal group including a least significant bit to an M-th bit (wherein M is a natural number of less than N) of the count signal and the upper count value represented by an upper count signal group including an (M+1)-th bit to an N-th bit of the count signal, wherein
   the lower count signal group comprises an M-bit Gray code count signal from the least significant bit to the M-th bit of the count signal, and a binary code count signal of the (M+1)-th bit of the count signal, and
   the upper count signal group comprises an (N-M) bit Gray code signal whose least significant bit is the (M+1)-th bit of the count signal.

2. The solid-state imaging device according to claim 1, wherein
   the upper count value is corrected according to a relationship between the lower count value and a reference value that is a value of a least significant bit of the upper count value when the upper count value is represented by binary code.

3. The solid-state imaging device according to claim 2, wherein
   when the reference value is 1 and the lower count value is 0 to $2^M-2^{M-1}-1$, 1 is added to the upper count value, when the reference value is 1 and the lower count value is $2^M-2^{M-1}$ to $2^{M-1}$, 1 is subtracted from the upper count value, when the reference value is 0 and the lower count value is $2^M$ to $2^M+2^{M-1}-1$, 1 is added to the upper count value, and when the reference value is 1 and the lower count value is $2^M+2^{M-1}$ to $2^{M+1}-1$, 1 is subtracted from the upper count value.

4. The solid-state imaging device according to claim 1, wherein
an N-bit count value is acquired by combining an M-bit count signal from the least significant bit to the M-th bit of the lower count signal group, and an (N-M) bit count signal from the least significant bit to the (N-M)-th bit of the upper count signal group.

5. The solid-state imaging device according to claim 3, wherein
an N-bit count value is acquired by combining an M-bit count signal from the least significant bit to the M-th bit of the lower count signal group, and an (N-M) bit count signal from the least significant bit to the (N-M)-th bit of the upper count signal group.

6. The solid-state imaging device according to claim 1, wherein
the counter circuit unit includes an N-bit binary counter that performs counting based on a clock signal, and a Gray code processing unit that performs exclusive-OR operation on respective adjacent bits of a signal output from the binary counter and generates a Gray code count signal, and
a most significant bit of the lower count signal group and a most significant bit of the upper count signal group are output without a processing of the Gray code processing unit.

7. The solid-state imaging device according to claim 5, wherein
the counter circuit unit includes an N-bit binary counter that performs counting based on a clock signal, and a Gray code processing unit that performs exclusive-OR operation on respective adjacent bits of a signal output from the binary counter and generates a Gray code count signal, and
a most significant bit of the lower count signal group and a most significant bit of the upper count signal group are output without a processing of the Gray code processing unit.

8. The solid-state imaging device according to claim 6, wherein
the counter circuit unit includes an M-bit first binary counter that performs counting based on the clock signal, and an (N-M) bit second binary counter that performs counting based on a signal generated by the first binary counter,
the most significant bit of the lower count signal group is output from the first binary counter without the processing of the Gray code processing unit, and
the most significant bit of the upper count signal group is output from the second binary counter without the processing of the Gray code processing unit.

9. The solid-state imaging device according to claim 7, wherein
the counter circuit unit includes an M-bit first binary counter that performs counting based on the clock signal, and an (N-M) bit second binary counter that performs counting based on a signal generated by the first binary counter,
the most significant bit of the lower count signal group is output from the first binary counter without the processing of the Gray code processing unit, and the most significant bit of the upper count signal group is output from the second binary counter without the processing of the Gray code processing unit.

10. The solid-state imaging device according to claim 1, wherein
an N-bit count value as a digital data of the pixel signal is acquired by combining the lower count value and the upper count value after a correction.

11. The solid-state imaging device according to claim 9, wherein
an N-bit count value as a digital data of the pixel signal is acquired by combining the lower count value and the upper count value after a correction.

12. A method for driving a solid-state imaging device including a plurality of pixels arranged to form a plurality of columns, each of the plurality of pixels generating a pixel signal corresponding to an amount of incident light by photoelectric conversion; a plurality of comparators provided for the plurality of columns, each of the plurality of comparators comparing the pixel signal and a reference signal varying with time and outputting a control signal when a magnitude relationship between the pixel signal and the reference signal is inverted; a counter circuit unit that outputs an N-bit count signal (wherein N is a natural number) indicative of an elapsed time from a start of varying the reference signal; and a plurality of memory units provided for the plurality of columns, each of the plurality of memory units holding each bit of the count signal at a time when the control signal is output, the method comprising:
acquiring a lower count value represented by a lower count signal group including a least significant bit to an M-th bit (wherein M is a natural number of less than N) of the count signal and an upper count value represented by an upper count signal group including an (M+1)-th bit to an N-th bit of the count signal; and
correcting either of the lower count value and the upper count value according to a relationship between the lower count value and the upper count value, wherein
the lower count signal group comprises an M-bit Gray code count signal from the least significant bit to the M-th bit of the count signal, and a binary code count signal of the (M+1)-th bit of the count signal, and
the upper count signal group comprises an (N-M) bit Gray code signal whose least significant bit is the (M+1)-th bit of the count signal.

13. An imaging system comprising:
a solid-state imaging device including
a plurality of pixels arranged to form a plurality of columns, each of the plurality of pixels generating a pixel signal corresponding to an amount of incident light by photoelectric conversion,
a plurality of comparators provided for the plurality of columns, each of the plurality of comparators comparing the pixel signal and a reference signal varying with time and outputting a control signal when a magnitude relationship between the pixel signal and the reference signal is inverted,
a counter circuit unit that outputs an N-bit count signal (wherein N is a natural number) indicative of an elapsed time from a start of varying the reference signal,
a plurality of memory units provided for the plurality of columns, each of the plurality of memory units holding each bit of the count signal at a time when the control signal is output, and
a correction processing unit that corrects either of a lower count value and an upper count value according to a relationship between the lower count value represented by a lower count signal group including a least significant bit to an M-th bit (wherein M is a natural number of less than N) of the count signal and the upper count value represented by an upper count signal group including an (M+1)-th bit to an N-th bit of the count signal, wherein the lower count signal group comprises an M-bit Gray code count signal from the least significant bit to the M-th bit of the count signal, and a binary code count signal of the (M+1)-th bit of the count signal, and the upper count signal group comprises an (N-M) bit Gray code signal whose least significant bit is the (M+1)-th bit of the count signal; and a signal processing unit that generates an image by using the count signal based on the pixel signal output from the solid-state imaging device.

14. An imaging system comprising:

a solid-state imaging device and a signal processing unit, the solid-state imaging device including a plurality of pixels arranged to form a plurality of columns, each of the plurality of pixels generating a pixel signal corresponding to an amount of incident light by photoelectric conversion, a plurality of comparators provided for the plurality of columns, each of the plurality of comparators comparing the pixel signal and a reference signal varying with time and outputting a control signal when a magnitude relationship between the pixel signal and the reference signal is inverted, a counter circuit unit that outputs an N-bit count signal (wherein N is a natural number) indicative of an elapsed time from a start of varying the reference signal, and a plurality of memory units provided for the plurality of columns, each of the plurality of memory units holding each bit of the count signal at a time when the control signal is output, wherein the signal processing unit corrects either of a lower count value and an upper count value according to a relationship between the lower count value represented by a lower count signal group including a least significant bit to an M-th bit (wherein M is a natural number of less than N) of the count signal and the upper count value represented by an upper count signal group including an (M+1)-th bit to an N-th bit of the count signal, and wherein the lower count signal group comprises an M-bit Gray code count signal from the least significant bit to the M-th bit of the count signal, and a binary code count signal of the (M+1)-th bit of the count signal, and the upper count signal group comprises an (N-M) bit Gray code signal whose least significant bit is the (M+1)-th bit of the count signal.

15. The imaging system according to claim 14, wherein the signal processing unit generates an image by using the count signal based on the pixel signal output from the solid-state imaging device.

* * * * *